(12) United States Patent
Brooks

(10) Patent No.: US 11,420,501 B1
(45) Date of Patent: Aug. 23, 2022

(54) CABIN AIR FILTERING AND DEHUMIDIFYING APPARATUS

(71) Applicant: William C. Brooks, Daytona Beach, FL (US)

(72) Inventor: William C. Brooks, Daytona Beach, FL (US)

( * ) Notice: Subject to any disclaimer, the term of this patent is extended or adjusted under 35 U.S.C. 154(b) by 0 days.

(21) Appl. No.: 17/712,133

(22) Filed: Apr. 2, 2022

(51) Int. Cl.
| | |
|---|---|
| *B01D 46/00* | (2022.01) |
| *B01D 50/00* | (2022.01) |
| *B01D 53/14* | (2006.01) |
| *B60H 3/06* | (2006.01) |
| *F24F 3/14* | (2006.01) |

(52) U.S. Cl.
CPC ....... *B60H 3/0608* (2013.01); *B01D 46/0036* (2013.01); *B01D 50/00* (2013.01); *B01D 53/14* (2013.01); *F24F 3/14* (2013.01); *B60H 2003/0683* (2013.01); *F24F 2003/144* (2013.01); *F24F 2003/1435* (2013.01)

(58) Field of Classification Search
CPC ........ B01D 53/02; B01D 53/14; B01D 50/00; B01D 46/00; B01D 46/0027; B01D 46/0036
See application file for complete search history.

(56) References Cited

FOREIGN PATENT DOCUMENTS

| CN | 103541871 A | * | 1/2014 |
|---|---|---|---|
| CN | 204319936 U | * | 5/2015 |

* cited by examiner

*Primary Examiner* — Robert A Hopkins
(74) *Attorney, Agent, or Firm* — Invention Protection Associates, LLC

(57) ABSTRACT

A vehicle cabin air filter apparatus for dehumidifying air within its vicinity prior to filtering particulates from air that flows through it along the normal path of flow from the HVAC system into the vehicle passenger cabin.

14 Claims, 3 Drawing Sheets

CABIN AIR FILTERING AND DEHUMIDIFYING APPARATUS

BACKGROUND

The present invention generally relates to vehicle cabin air filters, and it is specifically directed to a cabin air filtering apparatus that provides the cabin air filter traditional function of filtering unwanted particulates from the air that flows through it enroute to the vehicle passenger cabin, as well as providing the additional function of dehumidifying air within the vehicle's HVAC system. Most importantly, in contrast with prior art cabin air filters of the variety configured to absorb moisture from air flowing through them, the cabin air filter apparatus of the present invention is configured to positively attract and remove moisture from air that is merely within its vicinity and is proximate the evaporator coil of its HVAC system—and does so prior to that moisturized air flowing through filter enroute to the passenger cabin—all for the purpose of preventing water accumulation and mold formation that can create perceptible, often musty, odor in the passenger compartment.

In the automobile industry, there has long been observed a need to provide odor-neutralizing devices of varying types that serve to eliminate the nuisance of malodor in vehicle passenger compartments, and the prior art is replete with such devices, Some of these odor-neutralizing products are designed to hang from vehicle rearview mirrors, while others are designed to adhere to dashboards or other fixtures within the passenger cabin. Regardless of where and how they are to be mounted, what these products generally have in common is that they neutralize unpleasant odors by way of emitting more appealing aromas that are to overwhelm and mask the unwanted smells, as opposed to, in any way, inhibiting the creation of unpleasant odors in the first place.

What is also well known in the automobile industry is that undesirable cabin odor often results from the pooling of condensed water produced by a vehicle's HVAC system—specifically, condensed water vapor produced by the HVAC evaporator coil that fails to exit the vehicle through its condensate drain. That unintended condensation buildup can cause mold to form which can, in turn, create a perceptible odor in the air that the HVAC system, then, blows through its cabin air filter and into the passenger cabin. In fact, it is typically the case that the designed drainage paths fail to completely expel that condensation and are, therefore, inadequate to prevent the corresponding mold and odor formation.

There have been prior art attempts to deodorize vehicle cabin air using activated carbon (charcoal) air filters. Carbon filters arrest odor molecules by way of adsorption on their surfaces as air flows through them. However, the present inventor recognizes a need to supplement or even supplant that filter adsorption effort by employing means for inhibiting the accumulation of unexpelled condensed water that, ultimately, may be producing those very odor molecules—so that blocking nuisance odor from entering the cabin is not merely synonymous with or entirely reliant upon successfully filtering odor molecules from air as it flows through the cabin air filter. Moreover, the present inventor recognizes that solely relying on an activated carbon air filter to block cabin odor is problematic for the reason that if a significant volume of gaseous pollutants is adsorbed by it over time, its adsorption sites will become filled to the point that the carbon filter becomes unable to trap additional odor molecules and other pollutants as they flow through it.

Consequently, the present inventor recognizes a need to simply reduce the volume of those pollutants that even exist within a vehicle HVAC system to be engaged by a cabin air filter. He further recognizes that the introduction of water vapor attracting and dehumidifying elements within the vicinity of the vehicle's cabin air filter can reduce the accumulation of undrained, condensed moisture from the HVAC system's evaporator coil which, in turn, can reduce the amount of mold that forms therefrom which, in turn, can reduce the volume of odor molecules flowing toward the cabin air filter. He has, therefore, developed the dehumidifying and filtering apparatus of the present invention to have that cascading effect and fulfill that need.

SUMMARY

It is an object of the present invention to provide a vehicle cabin air filter device that, in addition to providing the essential cabin air filter function of removing dust, pollen, and other particulates from air that passes through it enroute to the vehicle cabin, also actively attracts and absorbs water vapor to dehumidify air that is merely within its vicinity and before such air flows through its filter component.

In one aspect of the present invention, the cabin air filtering and dehumidifying apparatus is formed by joining a filtering element with a physically proximate, but distinct, dehumidifying element. Typically, the filtering element will be in the form of a common cabin air filter fabricated of paper, cotton, or foam material. For superior effectiveness, the filtering element employed may be of the activated carbon variety. Desiccants positioned closely adjacent the filtering element act as a dehumidifying element in that they attract and remove moisture from the surrounding air before that air even engages the filtering element along its airflow path to the passenger cabin.

It is another object of the present invention to prevent unpleasant odor from being observed in the vehicle passenger cabin by way of preempting any buildup of undrained, condensed moisture that produces mold that produces odor which may be directed through the cabin air filter and into the cabin.

In another aspect of the present invention, whereas contemporary cabin air filters—including activated carbon ones—are designed to operate on air as that air flows through them enroute to the cabin, the present apparatus is designed to actively draw moisture from air that is in the vicinity of the HVAC evaporator coil before that moisturized air flows into the apparatus's filter component. More specifically, dehumidifying desiccants are mounted, in an air permeable enclosure(s), around the perimeter of the rectangular cabin air filter, Due to those desiccants being proximate the area of moisturized air (i.e., near the HVAC system evaporator coil), but outside the body of the air filter, they can arrest moisture from air before it flows into the filter and, importantly, before it can condense and accumulate to, potentially, find itself in an undrained pool that is prone to produce odorous mold. Thus, moisture is removed from the ventilation system environment before it even encounters the air filter itself. It is captured and retained outside of the air filter so as to dramatically reduce the probability that moisture retained by the air filter will be the main reason that the air permeability or particulate filtering characteristics of the filter are severely degraded.

DETAILED DESCRIPTION OF THE PREFERRED EMBODIMENTS

This disclosure, as defined by the claims that follow, broadly relates to an apparatus for dehumidifying and filtering vehicle cabin air in which the dehumidifying function is performed by a component of the apparatus that is distinct from its component that performs the air filtering function. These functions are separated, both physically and sequentially, so that: (1) effective air dehumidification can occur without the corresponding accumulation of retained moisture within the air filtering component that eventually impedes the flow of air through it, and (2) mold and odor producing condensed water accumulation in the ventilation system is thwarted. Preferred embodiments of such an apparatus are described in the discussion that follows.

Although various embodiments of the cabin air filtering and dehumidifying apparatus of the present invention may include additional discrete components to be discussed, fundamentally, the apparatus is formed by two components; a dehumidifier 20 and an air filter 10. In the preferred embodiment, the dehumidifier 20 is formed by a multitude of ball-shaped desiccants that are retained, at least in part, by air permeable mesh screening 32, and the air filter 10 is a commonly constructed paper, cotton, or foam cabin air filter that is rectangular, but of slightly smaller length and width than its standard-sized counterparts. Desiccants in other forms can be utilized within the spirit and scope of the present invention, though, and virtually any type of cabin air filter can be employed as well. In fact, using an activated carbon air filter could even enhance the dehumidifying and odor inhibiting effects of the overall apparatus.

Nevertheless, what is important regarding the dehumidifier component 20 employed, be it the preferred grouping of desiccant balls or something else, is that it functions to attract, absorb and, thus, remove moisture from air that is merely within the vicinity of the apparatus 1—and does so prior to that air flowing through the air filter 10 component. What is important regarding the air filter 10 component is that it functions to remove particulates from air flowing through it and into the passenger compartment of the vehicle.

Figure 1:
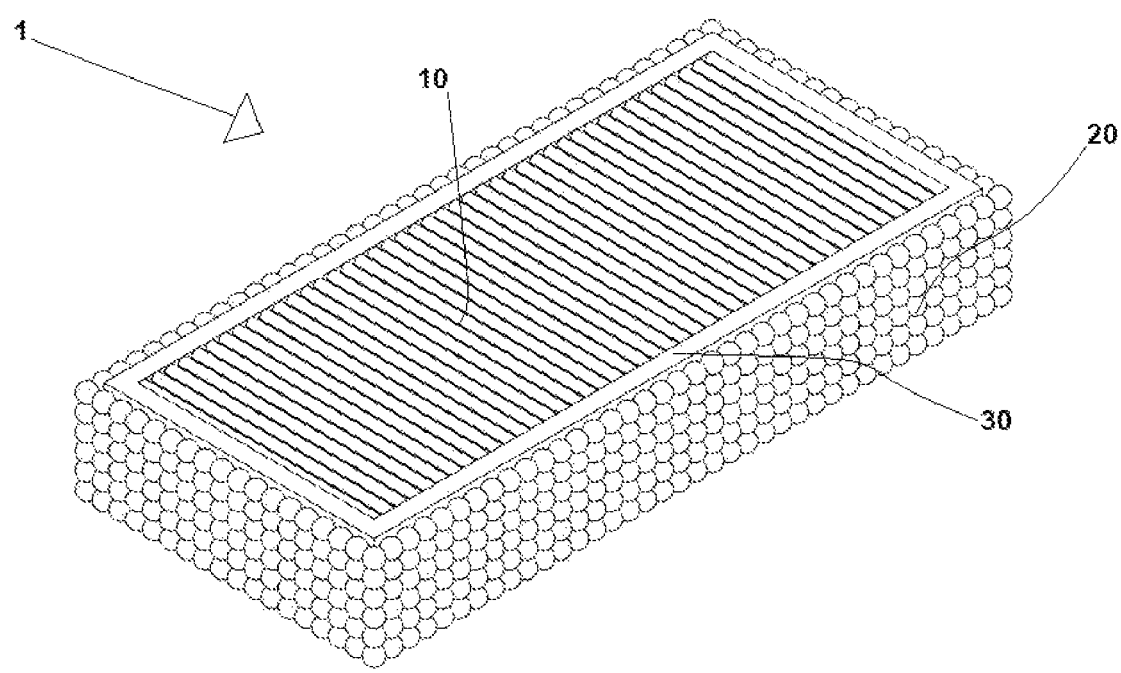
FIG. 1 is an inflow side perspective view of a cabin air filtering and dehumidifying apparatus of the present invention, the apparatus being shown absent its desiccant-retaining mesh.
Figure 2:
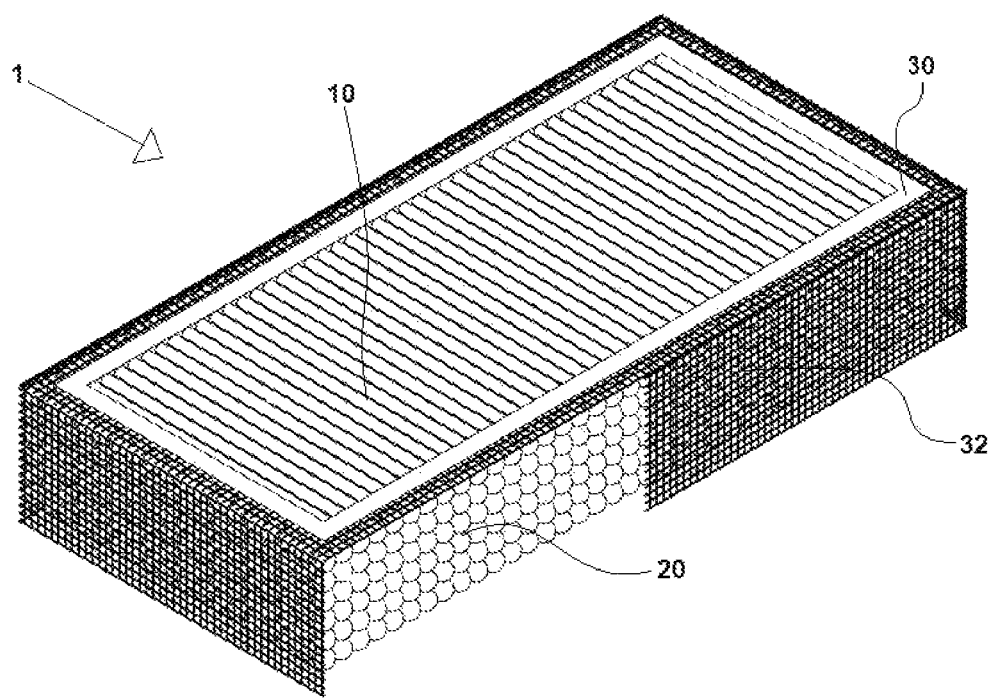
FIG. 2 is another inflow side perspective view of that apparatus, but with the apparatus being shown with its desiccant-retaining mesh absent only along a portion of its length.
Figure 3:
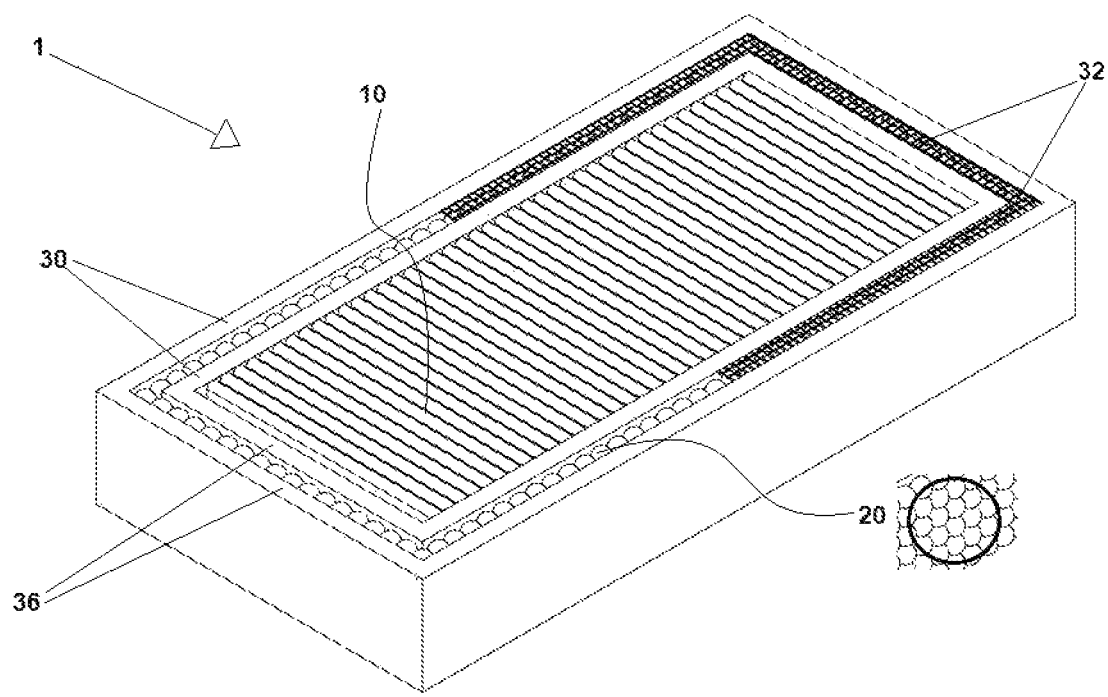
FIG. 3 is an inflow side perspective view of another cabin air filtering and dehumidifying apparatus of the present invention in which the support frame has both inner and outer retaining walls, the apparatus being shown absent its desiccant-retaining mesh along half of the inflow face placement thereof.

Nevertheless, preferably, and as is shown in FIGS. 1-3, the desiccants 20 are positioned around the rectangular perimeter of the air filter 10. It is also preferable that the apparatus 1 include a rigid frame of some configuration that provides structural support for the other components to mount to. More specifically, the air filter 10 is to mount within the frame, and the dehumidifier is to mount around it (or also within it, depending on the frame configuration). This preferably unitary, preferably plastic frame structure should feature some measure of bottom horizontal ("bottom" and "horizontal" only given the viewing orientation of the apparatus in FIGS. 1-3, but will be considered neither bottom nor horizontal when the apparatus is actually installed in vertical orientation within a vehicle) surface area (not shown) that undergirds a small, near perimeter portion of the air outflow face of the air filter 10 (the outflow face is not shown, but is a mirror image of its shown inflow face), as well as vertically oriented ("vertically" only given the viewing orientation of the apparatus in FIGS. 1-3) [inner] walls 30 within which the air filter 10 press fits.

As best discerned in FIG. 2, air permeable mesh screening 32 spans short distances outward the frame walls 30 along the planes of the inflow and outflow faces of the apparatus 1. In a preferred embodiment, that mesh 32, in cooperation with the frame walls 30 and even more mesh screening which forms the top, bottom, left side, and right side edges of the overall apparatus 1, form a breathable desiccant retaining enclosure surrounding the air filter 10. Alternatively, and as shown in FIG. 3, the frame can feature inner walls 30 and outer [solid, non-permeable] walls 36 between which the desiccants 20 are positioned and are retained by the combination of the inner perimeter frame walls 30, outer perimeter frame walls 36, and mesh screening 32 spanning perpendicularly between them along the inflow and outflow face planes. With either desiccant retaining enclosure construction, air permeable screening 32 allows the moisture absorbing desiccants 20 to be freely accessible to air flow and moisture vapor.

In addition to the alternative embodiments of various apparatus components previously described, within the spirit of scope of the present invention, there can be further variations to aspects of the present apparatus. For example, the dehumidifier component may not necessarily need to completely surround the perimeter of the air filter. In fact, desiccants could be adjacent only three, two or one side of the air filter if such positioning is deemed sufficient to adequately dehumidify vaporized air within the ventilation system. Furthermore, the dehumidifier element need not even be directly adjacent the filter at all. Rather, it could be spaced some distance from the filter (presumably, such that it is positioned even nearer the area where undrained, condensed water vapor would deposit) by way of a tether or other connecting means.

In any case, the preferred filtering and dehumidifying apparatus 1 is to be frictionally slid horizontally within the cabin air filter positioning guides existent in a vehicle as would a typical cabin air filter and such that the present apparatus is oriented in a [mostly] vertical plane.

What is claimed is:

1. A cabin air filtering and dehumidifying apparatus comprising:
   a vehicle cabin air filter configured to remove particulates from air flowing therethrough enroute to a vehicle cabin;
   a dehumidifier configured to attract and remove moisture from air; and
   wherein the dehumidifier surrounds the perimeter of the air filter to enable it to dehumidify air even without such air flowing through the air filter.

2. The filtering and dehumidifying apparatus of claim 1, wherein said dehumidifier comprises a plurality of desiccants.

3. The filtering and dehumidifying apparatus of claim 2, wherein said plurality of desiccants is disposed within at least one air permeable enclosure disposed adjacent said air filter.

4. The filtering and dehumidifying apparatus of claim 2, wherein said plurality of desiccants is disposed within at least one air permeable enclosure disposed in spaced relation with said air filter.

5. The filtering and dehumidifying apparatus of claim 1, wherein said air filter is planar.

6. A cabin air filtering and dehumidifying apparatus comprising:
- a support frame;
- a vehicle cabin air filter configured to remove particulates from air flowing therethrough enroute to a vehicle cabin, wherein the air filter is mounted within the support frame;
- a dehumidifier configured to attract and remove moisture from air; and
- wherein the dehumidifier is disposed outside of and surrounds the perimeter of the frame-mounted air filter to enable it to dehumidify air even without such air flowing through the air filter.

7. The filtering and dehumidifying apparatus of claim 6, wherein said dehumidifier comprises a plurality of desiccants.

8. The filtering and dehumidifying apparatus of claim 7, wherein said plurality of desiccants is disposed within at least one air permeable enclosure disposed adjacent said frame.

9. The filtering and dehumidifying apparatus of claim 7, wherein said plurality of desiccants is disposed within at least one air permeable enclosure disposed in spaced relation with said air filter.

10. The filtering and dehumidifying apparatus of claim 6, wherein said air filter is planar.

11. A cabin air filtering and dehumidifying apparatus comprising:
- a support frame for stably orienting the apparatus within a vehicle ventilation system;
- a vehicle cabin air filter configured to remove particulates from air flowing therethrough enroute to a vehicle cabin, wherein the air filter is rectangular with four perimeter edges, wherein the air filter mounts within the support frame such that there is spacing between at least one perimeter edge of the air filter and the support frame, and wherein
- screening material spanning between at least one perimeter edge of the air filter and the support frame forms an enclosed space; and
- wherein a plurality of desiccants is disposed within that enclosed space and surrounds the perimeter of the air filter.

12. The filtering and dehumidifying apparatus of claim 11, wherein said air filter has an airflow entry side and an opposing airflow exit side, and wherein said screening material comprises:
- entry screening spanning between the airflow entry side of said air filter and said support frame; and
- exit screening spanning between the airflow exit side of said air filter and said support frame.

13. The air dehumidifying and filtering apparatus of claim 12, wherein said support frame comprises inner and outer retaining walls, and wherein said air filter fits within the inner retaining walls.

14. The filtering and dehumidifying apparatus of claim 11, wherein said air filter is planar.

\* \* \* \* \*